Sept. 17, 1963 S. KOFINK 3,103,923
HEATING APPARATUS FOR AUTOMOTIVE VEHICLES
Filed Nov. 16, 1959
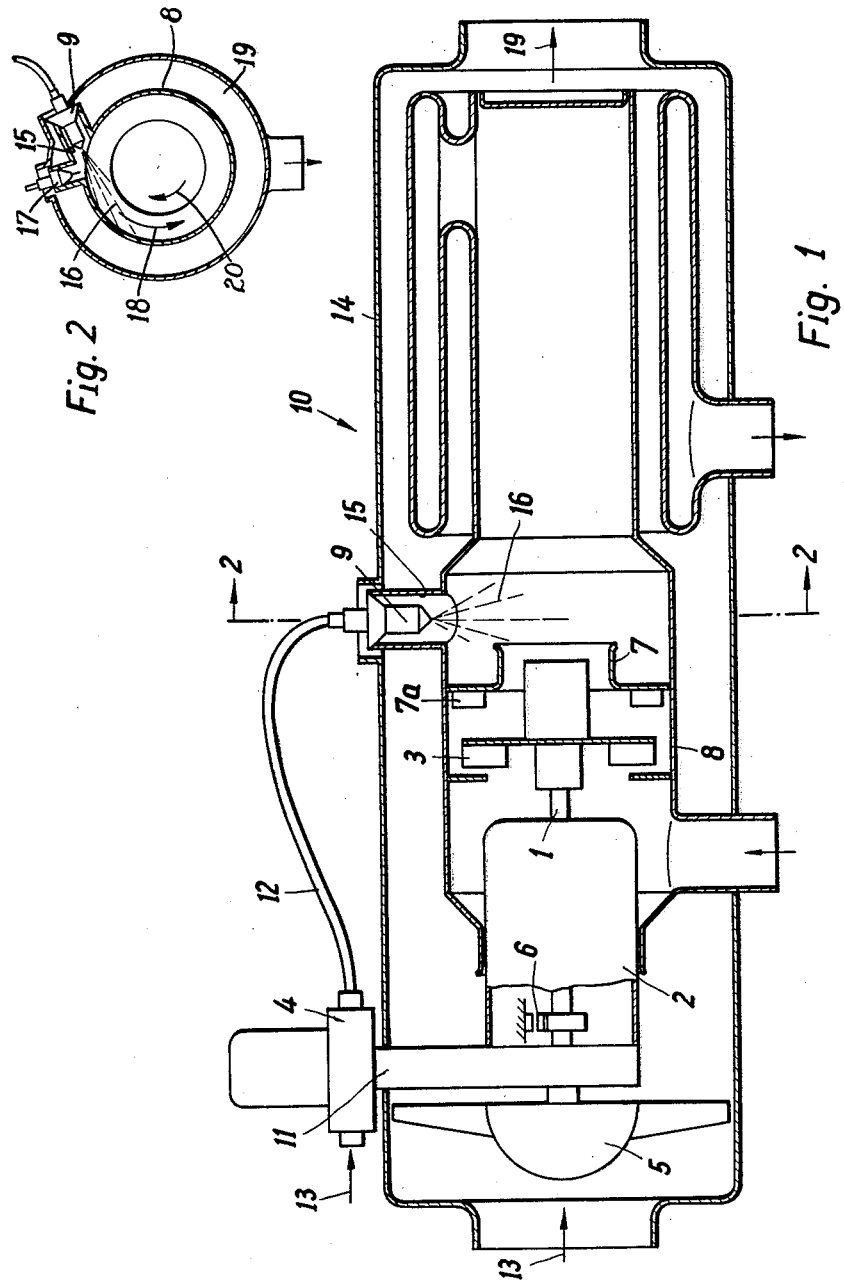
Inventor:
SIEGFRIED KOFINK ly shown in FIG. 2, the fuel spray nozzle 9 is so
United States Patent Office 3,103,923
Patented Sept. 17, 1963

3,103,923
HEATING APPARATUS FOR AUTOMOTIVE VEHICLES
Siegfried Kofink, Esslingen (Neckar), Germany, assignor to J. Eberspächer, Esslingen (Neckar), Germany, a German firm
Filed Nov. 16, 1959, Ser. No. 853,387
1 Claim. (Cl. 126—116)

The present invention relates, in general, to heaters and combustion devices for heating systems and, in particular, to a heating apparatus whose streaming heating medium is eminently suitable for heating automotive vehicles or like movable devices.

It is known in the prior art to provide a heating apparatus wherein the combustion air and the heating medium, which may be introduced in the form of a spray or jet, are separately fed into the apparatus.

For example, there may be mounted on the shaft of a common motor means to feed the fuel, means to feed the combustion air, and further means to convey the heating medium to desired locations. If a rotary atomizer is used, it is also mounted on the same shaft. In addition, an interrupter, which is connected with an ignition coil for the spark or heating plug, may also be mounted on the same shaft. In this conventional type of heating system, it is also known in the art to rotate the combustion air by guide vanes or similar means.

It is an object of the present invention to provide means affording a highly efficacious heating apparatus of the described type having means which achieve a highly economical result, so that the heating apparatus may be accommodated in a vehicle or the like without regard to the position in which it is to be installed.

It is another important object of the present invention to provide means conducive to a compact and simplified heating system having operable means to assure a flame which is very short and particularly stable.

It is a further object of the present invention to provide means envisioning a heating system which produces most favorable operation without regard to pressure fluctuations in the combustion system.

It is a further object of the present invention to provide means in a heating system assuring a very rapid and intimate mixture of the components for establishing the combustion.

It is a still further object of the present invention to provide means in a heating system leading to a combustion of great efficiency, in which the components collide with each other at relatively great speed.

The above and other objects of the invention will become further apparent from the following detailed description, reference being made to the accompanying drawing, showing a preferred embodiment of the invention.

In the drawing which illustrates the best mode presently contemplated for carrying out the invention:

FIG. 1 is a more or less diagrammatic representation of a heating apparatus pursuant to the present invention; and FIG. 2 is a sectional view taken on line 2—2 of FIG. 1.

Briefly described, the present invention relates to a heating system or apparatus utilizing a liquid fuel which is particularly adapted for motor vehicles or the like. Provision is made for a common drive motor provided with a shaft which operates fuel feed means, combustion air means and a heating medium conveyor means.

The shaft also operates an interrupter which is in circuit with the ignition coil. An air feed nozzle and the combustion chamber are disposed in coaxial relation with the drive shaft of the common motor. The fuel supply is provided tangentially to the combustion chamber and the atomized fuel is fed into the combustion chamber in opposition to the combustion air which is set into a predetermined direction of rotation by suitable guide means.

Referring now to the drawing in detail, there is shown a heating apparatus 10 pursuant to the present invention. This apparatus comprises a motor 2 having a shaft 1 which mounts a blower 3 for rotation of the latter to feed the combustion air. Through suitable coupling means 11 known per se, the shaft 1 also operates a membrane type pump 4 for feeding liquid fuel from a suitable source (not illustrated) through a supply conduit 12, as shown by arrow 13, to a spray jet or atomizer nozzle 9. Shaft 1 also mounts a primary air blower 5 for drawing air into the apparatus, as shown by arrow 13. In addition, an interrupter 6, preferably in circuit with the ignition coil for a hot or spark plug 17 for igniting the air-fuel combustion mixture, is mounted on said shaft 1.

The motor 2 and shaft 1 are mounted within a housing 14 in which there is defined a combustion chamber 8. The motor shaft 1 is in coaxial relation with the combustion chamber 8.

Within this chamber 8, and in coaxial relation therewith, there is defined an air feed nozzle 7 which is located forwardly of the air blower 3, in the direction of air flow indicated by arrow 13. The air feed nozzle 7 is provided with air flow guide vanes 7a which precede said nozzle in the direction of air flow.

The atomizer or spray nozzle 9 is disposed within a recess 15 provided in the combustion chamber 8. As best shown in FIG. 2, the fuel spray nozzle 9 is so mounted in recess 15 that the fuel jet or spray 16 issuing therefrom extends in a direction which is tangential to the cylindrical combustion chamber 8. It will also be noted that the spray nozzle 9 is located far from the center of the apparatus 10. More specifically, the atomizer nozzle 9 is mounted between the outer surface of the air nozzle 7 and the outer surface of the apparatus 10.

As best shown in FIG. 2, the combustion air is set in rotation by the action of blower 3 and guide vanes 7a so as to rotate as indicated by the arrow 20. However, it will be noted that the atomized fuel is fed from nozzle 9 in the direction of arrow 18 whereby the latter is introduced into the combustion chamber in opposition to the rotating combustion air. Heated air leaves the apparatus as shown by arrow 19.

It will be noted that the combustion air and the atomized fuel being brought together in opposite directions of rotation to form the combustible mixture collide with each other at great speed so that a rapid and good mixture is formed.

Various changes and modifications may be made without departing from the spirit and scope of the present invention, and it is intended that such changes and modifications be embraced by the annexed claim.

Having thus described the invention, what is claimed as new and desired to be secured by Letters Patent is:

A heater comprising an elongated outer tubular casing having an inlet at one end and an outlet at an opposite end for heating air, a tubular casing located within said outer casing, including a forward portion defining a combustion chamber and a rear portion, a motor disposed to close the rear portion of said tubular casing, a fan connected to said motor and rotating in said rear portion, inlet means connected into said inner tubular casing adjacent said fan, wall means including a tubular nozzle extending from the location of said fan into and coaxial of said combustion chamber, said tubular nozzle being of smaller dimension than said combustion chamber and having an end centrally arranged to discharge air into said combustion chamber, means disposed between said nozzle and said fan for whirling air and directing it centrally into said nozzle, said nozzle being elongated in an axial direction to confine the air for axially progressing whirling flow into said combustion chamber, a recess formed in the periphery of said combustion chamber extending outwardly therefrom, a nozzle located in said recess and arranged to direct fuel under pressure in a spray in a tangential direction opposite to the direction of rotation of the combustion air exiting from the nozzle and at a location spaced peripherally outwardly from and slightly beyond the discharge end of said nozzle, whereby the fuel is directed into the combustion air as it moves in an opposite axially progressing direction along said combustion chamber.

References Cited in the file of this patent

UNITED STATES PATENTS

| | | | |
|---|---|---|---|
| 792,667 | Rogers | June 20, | 1905 |
| 2,286,909 | Goddard | June 16, | 1942 |
| 2,757,662 | Baier et al. | Aug. 7, | 1956 |
| 2,777,508 | Jurisich | Jan. 15, | 1957 |
| 2,873,701 | Hohman | Feb. 17, | 1959 |

FOREIGN PATENTS

| | | |
|---|---|---|
| 18,359 | Great Britain | 1912 |